Figure 4:
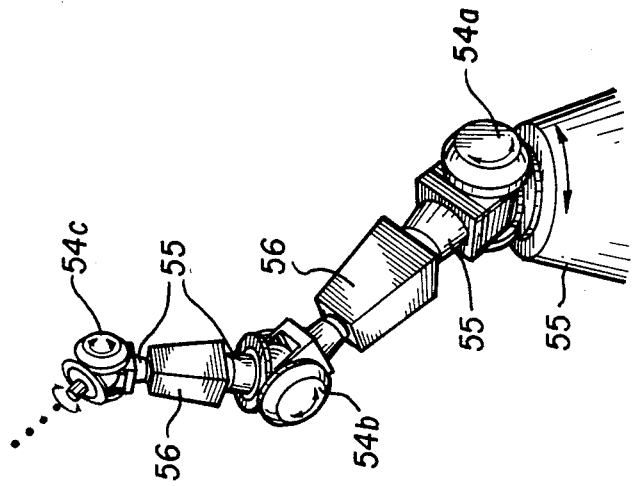

United States Patent [19]

Wurst

[11] Patent Number: 4,651,591
[45] Date of Patent: Mar. 24, 1987

[54] ARTICULATED DRIVE, MORE PARTICULARLY FOR INDUSTRIAL ROBOTS

[75] Inventor: Karl-Heinz Wurst, Korntal-Munchingen, Fed. Rep. of Germany

[73] Assignee: FISW Forschungs und Ingenieurgesellschaft fur Steuerungstechnik der Werkzeugmaschinen und Fertigungseinrichtungen GmbH, Stuttgart, Fed. Rep. of Germany

[21] Appl. No.: 794,013

[22] Filed: Nov. 1, 1985

[30] Foreign Application Priority Data

Nov. 12, 1984 [DE] Fed. Rep. of Germany ....... 3441332

[51] Int. Cl.$^4$ ............................................. F16H 37/06
[52] U.S. Cl. ......................................... 74/675; 901/28; 901/26; 901/23
[58] Field of Search ............. 74/665 A, 665 B, 665 C, 74/665 D, 665 E, 675, 435, 479; 901/28, 29, 26, 23

[56] References Cited

U.S. PATENT DOCUMENTS

| | | | |
|---|---|---|---|
| 3,386,694 | 6/1968 | Boyle | 74/675 |
| 3,987,498 | 10/1976 | Mason | 901/23 |
| 4,062,601 | 12/1977 | Pardo et al. | 901/28 |
| 4,398,110 | 8/1983 | Flinchbaugh | 901/23 |

FOREIGN PATENT DOCUMENTS

| | | | |
|---|---|---|---|
| 1348428 | 12/1964 | France | 74/675 |
| 0216405 | 7/1968 | U.S.S.R. | 74/675 |
| 0510239 | 6/1976 | U.S.S.R. | 901/23 |
| 0891425 | 12/1981 | U.S.S.R. | 901/26 |
| 1013269 | 4/1983 | U.S.S.R. | 901/23 |

Primary Examiner—Leslie Braun
Assistant Examiner—D. Wright
Attorney, Agent, or Firm—Armstrong, Nikaido, Marmelstein & Kubovcik

[57] ABSTRACT

Articulated drive, more particularly for industrial robots, having two axles kinematically independent of, and especially perpendicular to, one another, the axle movements being coupled with both rotary movements of the motors by means of a differential gear, wherein, in order to obtain a compact drive, the drives are arranged concentrically with one another as well as with both driving gear members of the differential gear.

10 Claims, 4 Drawing Figures

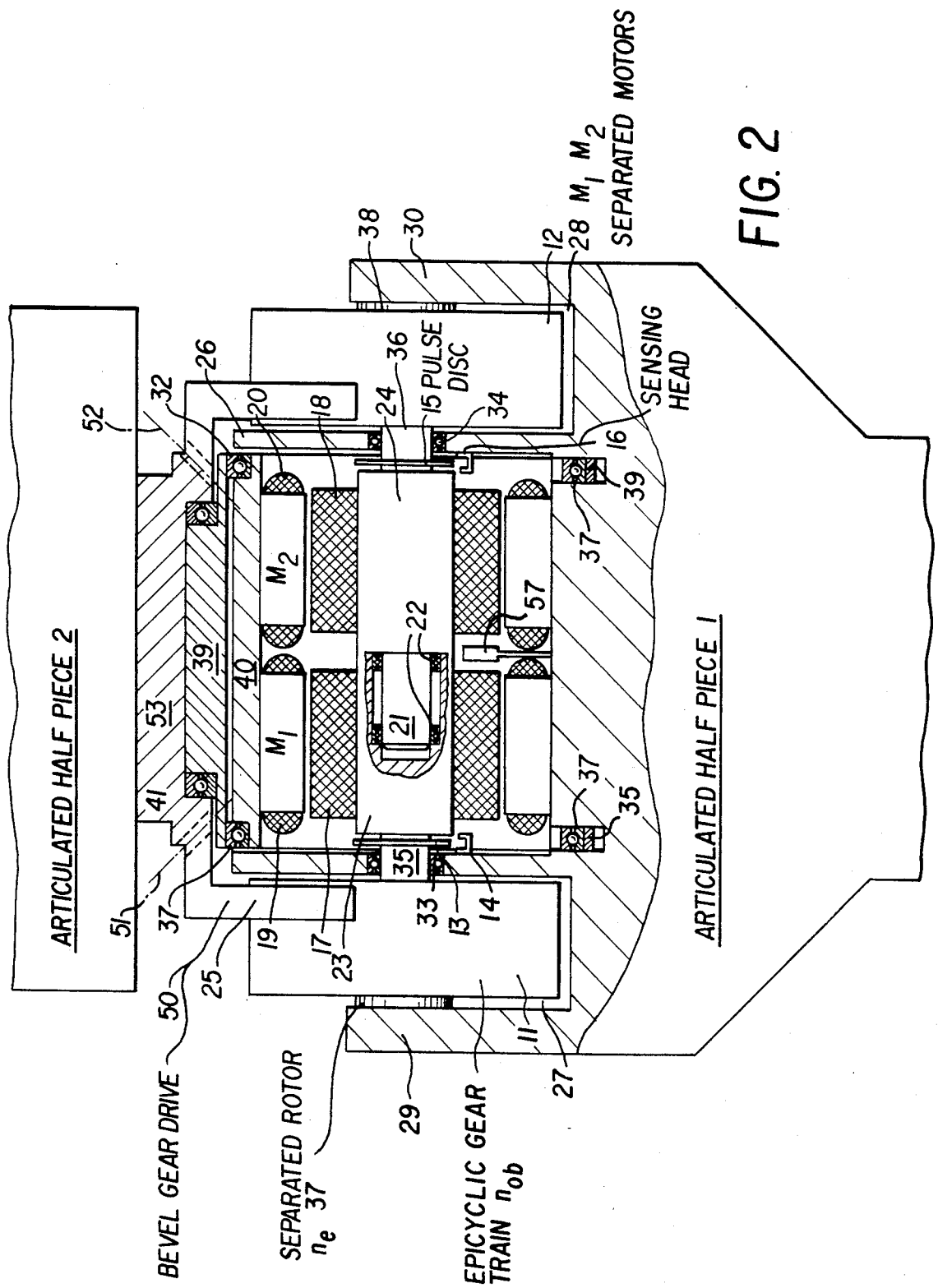

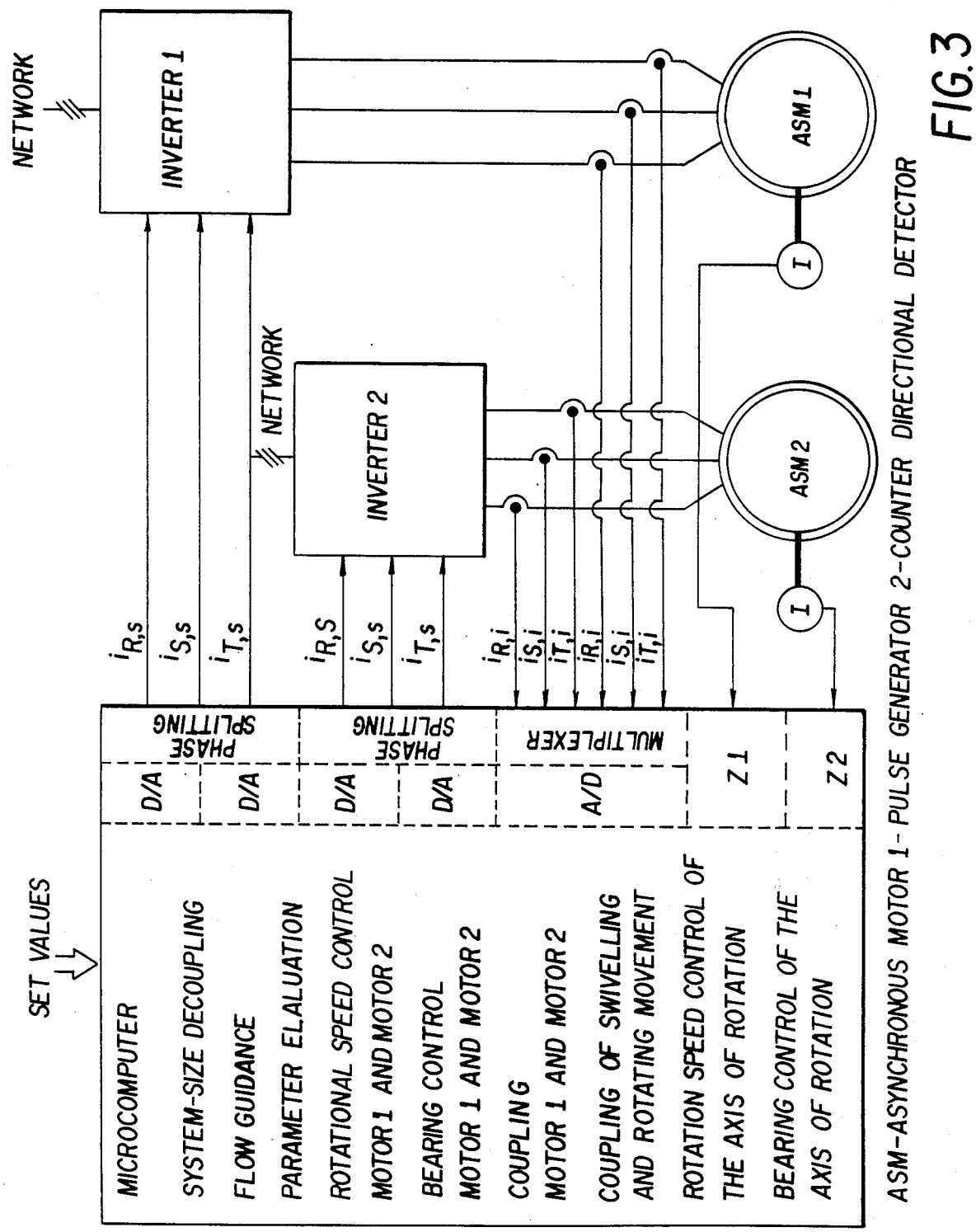

ARTICULATED DRIVE, MORE PARTICULARLY FOR INDUSTRIAL ROBOTS

The invention relates to an articulated drive, more particularly for industrial robots, having two axles kinematically independent of, and especially perpendicular to, one another, the axle movements being coupled with both rotary movements of the motors by means of a differential gear.

Such an articulated drive is described in West German Disclosure Publication OS No. 33 03 555 and in European Patent No. A-118 012. With this drive design, motor and gearing are combined into one unit, the motor parts being at the same time gear parts. A symmetrical load distribution, and thereby greater mechanical rigidity, is achieved by a gear arrangement symmetrical to the motor. By using a synchronous or asynchronous motor, the articulated drive of known construction requires no maintenance, it can be overloaded to a high degree, and satisfies the explosion protection requirements in a simple way. The articulated drive has great depth of performance and can advantageously be built in small sizes. The unit can be used directly as a joint both for buckle axles and hand axles.

With the articulated drive of known construction, a rotary movement can be carried out in relation to an axis, i.e., one motor gear unit shall be provided for each axis of rotation or swivel axis. Since, as a rule, robots, manipulators, and other automatically operating processing equipment shall carry out a series of rotary and linear movements, a plurality of rotary movements must be combined with each other in relation to axes of rotation perpendicular to one another in order to be able to perform the desired movement. Therefore, it is necessary to combine a plurality of these articulated drives of know construction in accordance with the number of rotational axes desired. This leads to a relatively bulky mechanical design, which, due to the large number of parts, results in a heavy mass. On account of the mass located further up front, which is especially attributable to the motors, the dynamic characteristics are often poor. Another disadvantage presently is that when working with a relatively short arm, one must operate with fairly small motors, since no adaptation is possible.

In order to be able to carry out all of the desired movements in relation to the six degrees of freedom, six drive units are required. This leads to an external arrangement of some of the motor/gear unit systems, and, in order to prevent the cables and the like from being caught, the corresponding lines must be guided rather snugly along the arm as well as therein. The result is a disadvantageous arrangement of the articulated drives and robots, rendering their operation difficult.

Another disadvantage when combining a plurality of articulated drives and arms into one robot unit is that even with a close clearance between the gears making up the individual arrangements, the overall robot arrangement, especially because of the arm lengths that must be added, has differing or unknown clearances, thereby limiting the accuracy with which the overall arrangement operates.

For the ease of handling of robots, one frequently uses the so-called Cincinnati ball in which the motor is installed at the rear on the arm and is connected with the gear unit mounted up front by means of a complex mechanism and a relatively long linkage. A considerable disadvantage of this articulated drive of known construction is that the arrangement is not rigid enough and bends under the effect of a load, resulting in an undesirably large clearance. Despite these drawbacks, robots equipped with such an articulated drive are employed especially for spray-painting vehicle bodies, because they are rather flexible and small and, hence, can reach relatively inaccessible places.

Hydraulic drives cannot be used for this application because of the seeping oil. Moreover, these drives create considerable control engineering problems, due to their non-linear properties with attendant slight loss in an oscillatory system. In addition, they are quite expensive, operate with an extremely high noise level, and require constant maintenance.

Another common practice, for example in the case of toothing equipment, is to couple two drives, i.e. the rotary-table drive and the slide drive. This is known as electric shaft balancing.

Other articulated drives are known for carrying out rotary movements using separate motors located in the robot arm (joint) and movements by means of another mechanical element (cylindrical gear unit, hollow shafts, chains, timing belt, etc.). This arrangement is expensive (requires many mechanical parts), has poor dynamic characteristics because of the additional mechanical components, and has a "longish" design, i.e., it is necessary to use arms with a minimum length that is excessive for a joint. This speaks against an arbitrary modular design. Furthermore, as a result of this longish construction, as one of the two joints is moving, the coupled elements must carry out extensive compensating movements.

Because of the separate mounting of the motors, their powers cannot be combined for the principal "swivelling and rotating" movements (West German Disclosure Publication No. 33 12 404).

Another differential gear mechanism is known in which two movements are obtained by means of two separate motors and additional mechanical drive elements. This manner of arranging motors and differential gears, too, occupies too much space, has poor dynamic characteristics, and is too "longish" for a modular design.

The invention has as its object the provision of an articulated drive with a simple and reduced mechanical design and great depth of performance.

By choosing the novel arrangement, one can for the first time satisfy the theoretically minimum space requirements for a compact joint. For the first time, too, one can achieve a kinematically unrestricted modular system with the object of connecting one after the other any number of rotating and swivelling movements in the narrowest space possible, such as, for instance, necessary for spray-painting and grinding robots. As a result of the compacted autonomous structure, drive units (e.g. larger or smaller drive elements) can be replaced in such a way that it does not affect the size (length and cross section) of the axle-connecting elements, i.e. the space between two joint members.

The articulated drive embodying the invention is simply designed, does not occupy much space, and has a relatively small number of mechanical parts; the mass ratios are much better. With the articulated drive incorporating the invention, two movements of the axis of rotation can be combined, that is to say, simultaneously and in one step, while in conventional drives two separate swivelling or rotating movements must be carried out independently of each other. Because of the moment distribution, the motor power is applied to two gear units. Each motor can be used simultaneously with the other motor for a swivelling movement on a given axle or for a rotary movement of the mass to be moved. In sum, the powers of the motors required for purely swivelling or purely rotating motions are smaller than in the case of articulated drives of known construction. Further, due to the favorable arrangement of the axis of rotation, the torque needed for the rotary movement is smaller than the torque required for the swivelling movement, and the sum of the torques required for two combined movements of the axis of rotation is smaller than the sum of the torques required for separate drives. Therefore, up to 50% less motor power can be used. As an example, two 0.5-kilowatt, instead of two 1-kilowatt, motors can be employed. The use of smaller motors, in turn, will yield better mass ratios.

Basically, any type of motor can be used for the articulated drive according to the invention, but asynchronous motors are preferred because of the freedom from maintenance.

True, in the past a velocity and distance-measuring system was used for each motor, but the arrangement in the case of the articulated drive of the invention is highly suitable, because all the measuring systems are now placed in the joint, so no extra lines of any kind that would also have to be moved are required.

Advantageously, a bevel-gear unit and an epicyclic gear unit (planetary and harmonic-drive gear unit) are used as gearing for the conversion of rotational speed and torques. Harmonic-drive gear units are relatively small and produce large transmission ratios; they are mostly used in robots. A disadvantage from the control-engineering standpoint is that they curve under the effect of a load. In the articulated drive according to the invention, this flexibility is nullified by the split construction, i.e. the arrangement of the 2-piece gear unit around the two drive motors, which leads to rigid harmonic-drive gearings. The external gear of the epicyclic gear train unit is rigidly connected to a segment of a bevel gear.

Due to the coupling by means of the bevel gear, a swivelling movement is carried out when driving both motors in the same direction, while a contrarotating drive produces a rotary movement of the articulated half piece coupled with the bevel gear. The possible reduction in power of the motors results from the fact that, as mentioned earlier, the torques of both motors are available for the purely swivelling or purely rotating movement. Power separation takes place in one coupled movement, i.e. a rotating and swivelling movement executed simultaneously. This coupled motor drive permits clearance-free use of the invention, so an arrangement provided with this articulated drive can essentially move without error. This is based on the fact that a clearance $\epsilon$ can be turned out automatically by slowing down both motors slightly in relation to each other. In this case, the actual size of the clearance $\epsilon$ can be disregarded, because the clearance is fully corrected by the control algorithm contained in the control and regulation system. in this way, the mechanical correction of the clearance that otherwise takes place incompletely and at great expense can be avoided, and the construction becomes considerably simpler than in articulated-drive arrangements known from the prior art.

Another advantage of the articulated drive of the invention is the fact that one can brake unilaterally, while in the past one brake per drive was required. This means that only one brake need be provided for both motors.

From the control-engineering viewpoint, the combined drive unit of the invention causes no problems. One need provide only one further inverter for the second motor and one coupling for both motors and for the rotating and swivelling movements.

The articulated drive of the invention is suitable not only for hand axles, but also for principal and buckle axles. In order, for example, for an articulated robot to have six degrees of freedom of movement, heretofore six drive arrangements were needed in six places. Admittedly, when using articulated drives and arrangements according to the invention, six drive units, distance-measuring systems, control units and wires are needed as in the past, but these parts are arranged only in three places in the assembled robot so that, on balance, the arrangement is substantially more compact and is provided with fewer lines and the like, since only one fitting is required for each joint.

Articulated units or arrangements according to the invention are not only kinematically independent, they also have an automatic clearance compensation. In contrast to arrangements of known construction, a combination of these articulated arrangements will not result in an enlargement of the clearance, but will preserve the freedom from clearance existing in an arrangement.

This arrangement permits the use of the articulated drives and articulated arrangements of the invention in a modular system in accordance with the present trend. If a joint provided with an articulated drive of the invention is provided with an adapter for connecting pieces, any center portion can be joined as required, and a robot can be put together from these parts as desired. This means that, of course, even if the arms are rather short, more powerful drive motors can be used, or drive units that are more effective than heretofore are available.

Another characteristic of the novel arrangement is the fact that, as a result of the compacted structure, the joint can easily be installed in the working space of machine tools with the object of handling tools.

Figure 1:
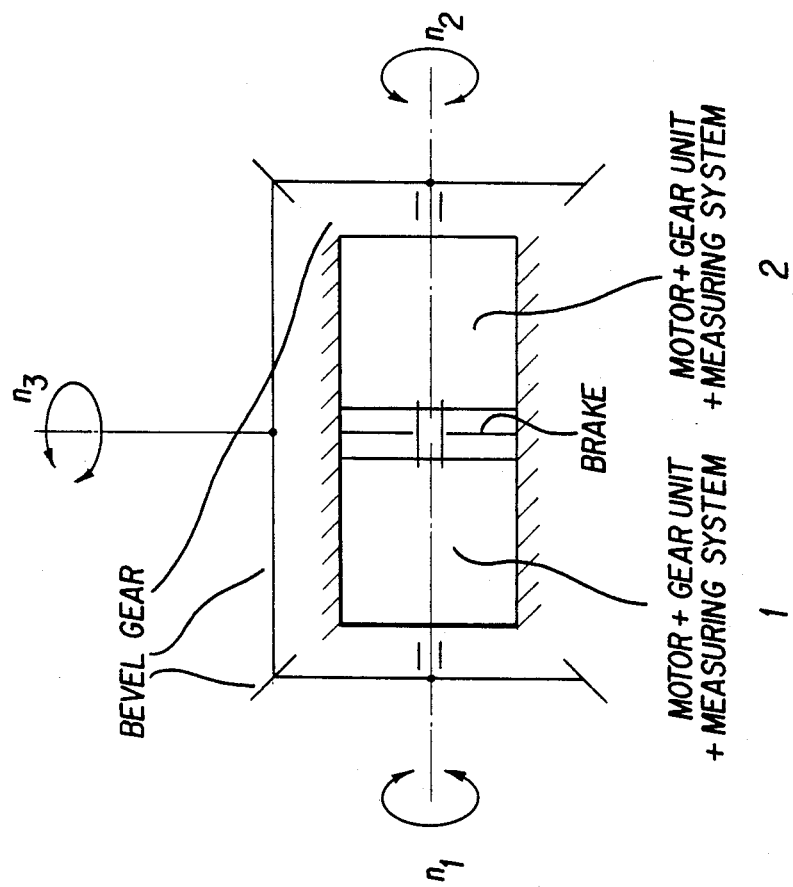

The invention will now be described in detail with reference to an embodiment of the invention and essential features will be discussed with the aid of the drawing, in which:

FIG. 1 is a schematic representation of the coupled swivelling and rotating drive, FIG. 2 is an embodiment of an articulated drive according to the invention, FIG. 3 is a schematic representation of a control and regulation for the articulated drive depicted in FIG. 2, FIG. 4 is an embodiment of a kinematically unrestricted modular system.

FIG. 1 is a schematic representation of the coupling of a swivelling and rotating movement in the case of the articulated drive incorporating the invention. In this representation, the articulated half pieces, between which the novel articulated drive operates, is not shown. The first articulated half piece is shown at the bottom of FIG. 1 and the second articulated half piece is shown at the top, so the arrangement shown is located in the space between the articulated half pieces. In this space are two units, each comprising a motor, a gear unit and a measuring system arranged coaxially with one another, that is to say, the particular rotational axes $n_1$ and $n_2$ are in a straight line to each other in a horizontal direction. The gear units not shown in detail are epicyclic gear trains, the axes of which are in a straight line to the motor axis or parallel thereto. A brake is mounted between the two motors and can act thereon. The shaft running through the axes of rotation of the motors serves as a shaft for swinging the articulated upper half piece in relation to the articulated lower half piece.

Above the two arrangements comprising motor, gear unit and measuring system and meshing with the two gear units is a bevel-gear pair, on which the epicyclic gear trains can roll off and the axis of which is perpendicular to the swivel axes $n_1/n_2$. As the bevel-gear pair rotates about its axis $n_3$, the articulated upper half piece rotates about that axis.

When the two motors 1 and 2 are driven together, i.e. when the position data and the velocities of movement are identical, or when $$\varphi_1 = \varphi_2 \text{ and } \dot{\varphi}_1 = \dot{\varphi}_2$$

both motors are rotated in the direction of the upper arrow or in the direction of the lower arrow in relation to their axes of rotation $n_1$ or $n_2$, and the articulated half piece 2, as a result of the coupling by means of the bevel gear, executes a swivelling movement about the swivel axis. When $$\varphi_1 = \varphi_2 \text{ and } \dot{\varphi}_1 = \dot{\varphi}_2$$

that is to say, when both motors are driven in contrarotation at the same velocity of movement in relation to the swivel axis running therethrough, the upper articulated half piece rotates about its axis ($n_3$). A combined rotating and swivelling movement results:

$$\varphi_1 + \xi = \varphi_2 - \xi \text{ or}$$

$$\dot{\varphi}_1 + \dot{\xi} = \dot{\varphi}_2 - \dot{\xi}$$

It is also possible that only one motor is in operation. In that case, the articulated upper half piece rotates about its axis. However, this mode of operation is preferred only in a few cases.

The clearance $\epsilon$ present in the gear unit is turned out by causing both motors to slow down around said clearance:

$$\varphi_1 = \varphi_2 - \epsilon$$

Even if a clearance exists, both motors operate relatively to one another as if there were no clearance.

In the following section, an embodiment of an articulated drive according to the invention is described in detail with reference to FIG. 2. As in FIG. 1, one articulated half piece 1 is at the bottom and the second articulated half piece 2 is at the top, and therebetween is arranged the unit comprising the two motors $M_1$ and $M_2$ and the two epicyclic gear trains or gear train members 11 and 12, as well as the two distance and velocity-measuring systems 13, 14 and 15, 16. In the embodiment shown, the two separated motors $M_1$ and $M_2$ are asynchronous motors with separated rotors 17, 18 and stators 19, 20. Of the shaft 23 of rotor 17 of motor $M_1$ a portion is shown as broken away, so that a connecting shaft arrangement 21, rotatably connected with the rotor shaft 23 by means of an arrangement of bearing elements 22, is visible. The axial alignment of the two rotor shafts 23 and 24 is effected by means of this shaft arrangement.

Both motors $M_1$ and $M_2$ are arranged in a recess of the head of the articulated half piece 1, which lies in the center of the articulated half piece and is defined outwardly by two fork-shaped limiting wall section bars 25, 26. Outside the bars is another recess 27, 28 which is limited on the outside by a wall section 29, 30 of the articulated half piece 1, each of the two walls 29 and 30 forming the external wall of the articulated half piece 1. In each of these recesses 27 and 28 are arranged epicyclic gear trains 11, 12 which in the drawing extend from the recess in an upward direction. The epicyclic gear trains are each coupled with the rotor axles 23, 24 via gear axles 35, 36 arranged above the bearings 33, 34. On the outside, the two epicyclic gear trains 11, 12 are mounted in the external wall sections 29, 30 via shaft sections 37, 38.

In the embodiment shown, the velocity and distance-measuring systems are each comprised of a scanning head 14, 16 and a pulse disc 13, 15. Instead of such an optical device for measuring the rotor-position angle or the angular position of the first articulated half piece in relation to the second articulated half piece, a magnetic or Hall effect system can also be employed. The sensing heads 14, 16 are fixedly mounted inside the wall sections 25, 26, so that the pulse discs 13, 15 resting on the gear-unit axles 35, 36 can be moved relatively thereto.

By way of example, both epicyclic gear trains can be harmonic-drive gear units or planetary gear units. In the embodiment shown, harmonic-drive gear units are employed having a large transmission ratio of approximately 10 to 20 to approximately 100 to 200 ($n_{ab}$). A bevel-gear drive 50, which in FIG. 2 is shown by plotting the two L-shaped knuckles of the bevel-gear drive into the epicyclic gear train, meshes with the latter. The bevel-gear drive is connected to the articulated half piece 2, the arrangement and the transmission ratio of said gear unit, idle gears, etc. being free. The coupling is indicated by two dot-dashed lines 51, 52 running diagonally from the inside to the outside. In this FIG. 2, the coupling occurs via a coupling section 53. Section 53 is connected to the drive unit by means of a bearing assembly 37 to 41. The bearing assembly comprises a stationary section 40, which is mounted above the stators 17, 18. A cylindrical section 39 is arranged concentrically therewith. It is mounted on the upper side substantially coaxially with the swivel axle adjoining the coupling section 53 and extending thereinto via bearing elements 41 and has on the lower side in the area of the articulated half piece 1 only narrow fork-shaped sections which are supported in recesses axially within the sections 25, 26 and below the stators 19, 20 in bearing sections 37.

FIG. 3 shows an example of a control and regulation system for the drive depicted in FIG. 2. Two inverters 1 and 2 are provided for the two asynchronous motors ASM1, ASM2. For example, they are direct voltage buffer inverters with transistor-pulse rectifier inverters. Furthermore, a phase-current control and a control unit with microcomputer are provided for guiding the motors in flux, torque, rotational speed and position. By means of pulse generators I, counting pulses are transmitted from both motors to counters 71, 72, by means of which the rotational speed and position of the axis of rotation are regulated.

Set values are input in the microcomputer and a system-size decoupling, flux guidance and parameter evaluation are performed. By means of a D/A conversion, set phase-current values $i_{R,s}$, $i_{S,s}$, $i_{T,s}$ are fed to inverter 1 or 2 and the actual values $i_{R,i}$, $i_{S,i}$, $i_{T,i}$ are fed to a multiplexing system and digitally converted by means of an A/D transducer. The two motor drives and the swivelling and rotating movements are then coupled by means of these values. Preferably, the control of rotational speed and position is such that it is carried out on the one hand with respect to one motor and, on the other, with respect to the coupling of the two motors.

FIG. 4 shows the modular-design type arrangement of a plurality of articulated arrangements as taught by the invention. A plurality of articulated drives 54 a, b, c of varying size are strung together by means of differently sized adapters 55 and axle-connecting elements 56. The length of the axle-connecting elements can approach zero. Rotating and swivelling movements in an arbitrary sequence can be produced by means of the depicted arrangement, say, of a modularly constructed industrial robot.

The brake shown in FIG. 1 is illustrated in FIG. 2 as a disc brake 57. It is attached to the stator foundation between the two drives and acts at the same time on both rotors.

I claim:

1. An articlated drive having two members arranged for relative movements about two axles kinematically independent of and prependicular to one another, comprising:
   a first articulated half piece having a longitudinal axis and first and second parallel wall sections separated from each other and extending longitudinally of said first articulated half piece parallel to said longitudinal axis;
   first and second drive motors coaxially arranged adjacent to each other on an axis extending transversely of said first articulated half piece axis between and perpendicular to said first and second wall sections, said first and second motors each having a stator fixed to said first articulated half piece and having rotor shafts in axial alignment on said transverse axis and rotatably connected to each other;
   a first epicyclic gear train positioned between and having elements operatively connected to said first motor and said first wall section;
   a second epicyclic gear train positioned between and having elements operatively connected to said second motor and said second wall section;
   a second articulated half piece supported on said first articulated half piece via a coupling section for rotational movement relative to said first articulated half piece about said longitudinal and transverse axes; and
   a differential gear drive operatively connecting said first and second epicyclic gear trains to said second articulated half piece to impart rotational movements thereto about said axes depending on relative driving direction and speed of said first and second drive motors.

2. An articulated drive as recited in claim 1 wherein said first and second motor rotor shafts are connected to each other by a connecting shaft arrangement extending from one said rotor shaft into the other said rotor shaft and supported therein by bearing elements.

3. An articulated drive as recited in claim 1, wherein said first and second epicyclic gear trains each include an external member having connected thereto a bevel gear of said differential gear drive which engages with a bevel gear portion of said coupling section.

4. The articulated drive as set forth in any one of claims 1 to 3, wherein the motors (M1, M2) are asynchronous motors.

5. The articulated drive as set forth in any one of claims 1 to 3, wherein the motors (M1, M2) are synchronous motors.

6. The articulated drive as set forth in any one of claims 1 to 3, wherein a brake (57) acting on both motors (M1, M2) is mounted therebetween.

7. The articulated drive as set forth in claim 1 or 2, wherein each epicyclic gear train (11, 12) is a harmonic-drive gear train.

8. The articulated drive as set forth in claims 1 or 2, wherein each epicyclic gear train (11, 12) is a planetary gear train.

9. The articulated arrangement as set forth in claim 1, wherein a plurality of articulated arrangements with arms of a desired kind and length are provided and are combined into a robot system.

10. The articulated arrangement as set forth in claim 9, characterized by the combination with at least one articulated arrangement with a conventional articulated drive.

* * * * *